(No Model.)

A. DE WITT.
REEL FOR FENCE WIRE.

No. 391,404. Patented Oct. 23, 1888.

Witnesses:
M. P. Smith
R. H. Orwig

Inventor:
Alvin DeWitt,
By Thomas C. Orwig, Att'y.

UNITED STATES PATENT OFFICE.

ALVIN DE WITT, OF ELLIOTT, IOWA.

REEL FOR FENCE-WIRE.

SPECIFICATION forming part of Letters Patent No. 391,404, dated October 23, 1888.

Application filed March 20, 1888. Serial No. 267,880. (No model.)

*To all whom it may concern:*

Be it known that I, ALVIN DE WITT, a citizen of the United States of America, and a resident of Elliott, in the county of Montgomery and State of Iowa, have invented a Machine for Making Barbed-Wire Fences, of which the following is a specification.

My object is to save time and labor in handling barbed wire as required in making and unmaking fences; and my invention consists in the construction and mechanism for winding and unwinding wire from a spool, mechanism for stretching wire, and a carriage adapted for lifting and supporting and carrying a spool of barbed wire without touching the spool or wire with the hands, as hereinafter set forth, pointed out in my claims, and illustrated in the accompanying drawings, in which—

Figure 1:
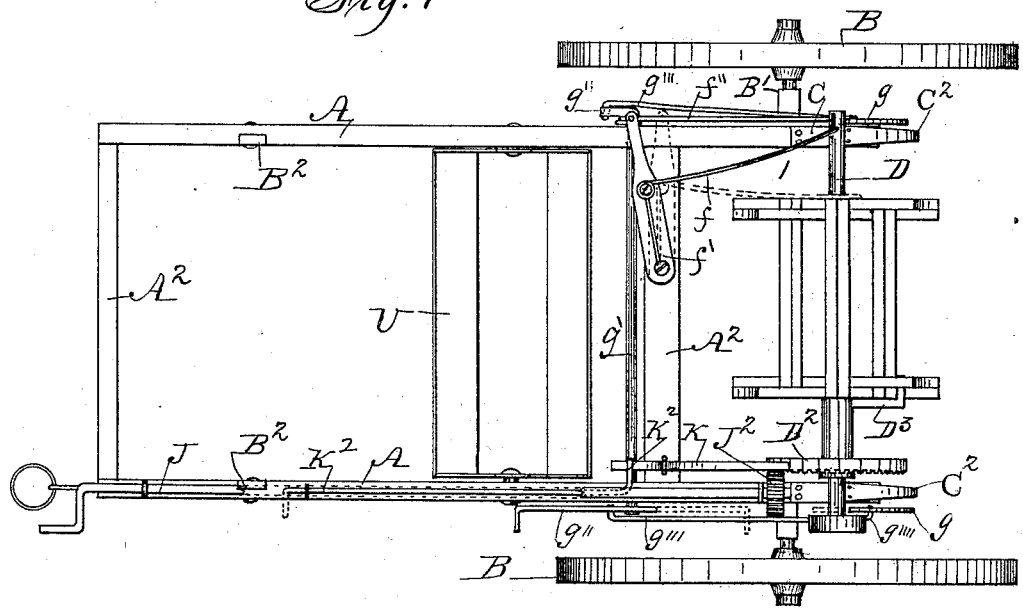
Figure 2:
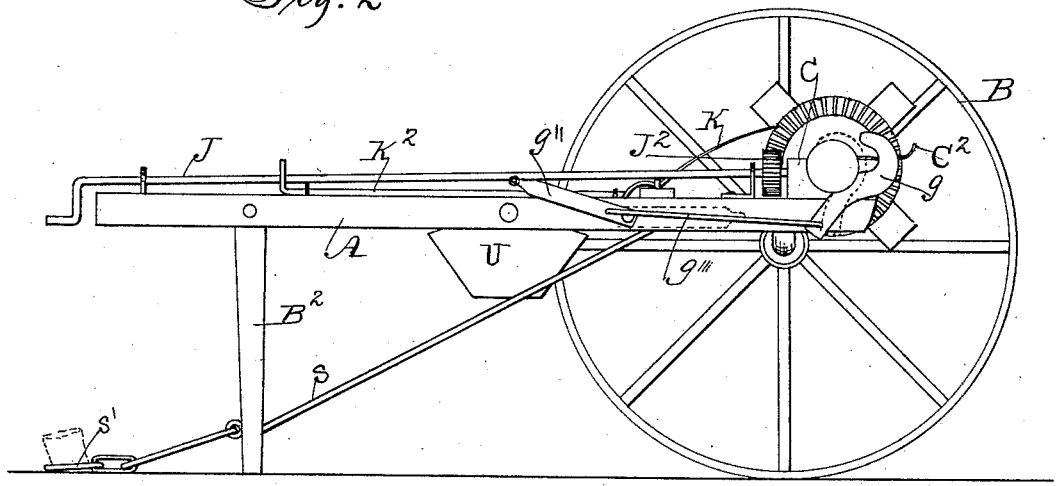

Figure 1 is a top view, and Fig. 2 a side view, of my complete machine.

A are the side pieces, and $A^2$ the cross-pieces, of an oblong frame. The cross-piece at the rear end is rounded, to adapt it for being seized in the hands of the operator, as required in operating the machine in lifting a spool of wire and in moving the machine backward and forward.

B are traction-wheels secured to the front end portions of the side pieces, A, by means of stub-axles B′, fixed to the frame.

$B^2$ are legs fixed to the rear portions of the same side pieces, A, as required, to retain the frame in a horizontal position.

C are bearing-blocks fixed to the front ends of the side pieces, A, to support a rotating shaft.

$C^2$ are curved extensions formed on or fixed to the bearings C in such a manner that they can be utilized in picking up and elevating a spool of wire.

D is a rotating shaft detachably placed in the bearings C.

$D^2$ is a wheel that has ratchet teeth or notches on its periphery fixed to the shaft D.

$D^3$ is a lateral projection formed on or fixed to the hub of the wheel $D^2$, to engage a spool placed upon the shaft for the purpose of rotating the spool with the shaft.

$f$ is a spring fixed to a lever, $f'$, that is pivoted to the cross-piece $A^2$ of the frame in such a manner that it will, in its normal condition, when in contact with a spool, press the spool on the shaft toward the hub of the wheel $D^2$, as required, to let the projection $D^3$ engage the spool, and also aid in retaining a shaft in the bearings C. Rod $f''$ also connects the lever $f'$ with the hook $g$, so that the hook and lever will be operated simultaneously.

$g$ are hooks pivoted to the sides A in such a manner that they will engage the shaft D, as required, to retain it in its bearings when in operation.

$g'$ is a rock-shaft in bearings formed in or fixed to the side pieces, A. It may have a crank-handle, $g''$, at one end, and arm $g''''$ at the other end, connected with the hooks $g$ by means of rods $g'''$ in such a manner that the hooks can be readily thrown on and off the shaft by means of the rock-shaft, as required, to fasten and unfasten the shaft D at pleasure.

When the hooks $g$ are thrown off from the shaft D, the springs $f$, that aid in retaining the shaft in its bearings, will be simultaneously moved in an opposite direction and away from the hooks, and when the hooks are thrown on the springs will make a reverse motion.

J is a rotating shaft that has a crank on its rear end and a pinion, $J^2$, on its front end, and is secured in parallel position with one of the side pieces, A, by means of bearings fixed to the side piece in such a manner that the pinion will engage the face-wheel $D^2$, as required, to rotate the shaft D and a spool placed thereon in reverse ways at the will of the operator, who can stand at the rear of the machine and rotate the shaft at pleasure, as required, to wind wire upon the spool or upon the hub of the face-wheel $D^2$, intervening between the wheel and spool.

K is a pawl pivoted to the cross-piece of the frame to engage the ratchet-faced periphery of the face-wheel, as required, to lock the shaft D, to prevent any relaxation of a wire when stretched and before it is fastened to a fence-post.

$K^2$ is a rock-shaft that extends along the frame A, and is bent at right angles at its ends, so it can be used for operating the pivoted pawl and unlocking the wheel D.

$s$ is a bracing-rod that extends from the front portion of the frame to one of the feet at the rear and terminates in a hook or eye, to which is attached a ring, $s'$, by means of links, in such a manner that a stake can be driven through the ring to fasten the machine to the ground when wire is to be stretched thereby.

U is a tray suspended between the side pieces, A, of the frame in a convenient position for carrying fence staples and tools.

From the foregoing description of the construction and function of each part of the machine it is obvious that the shaft D can be readily detached from the machine and slipped through a spool of wire, and the rear of the machine then elevated to allow the projections $C^2$ to extend under the shaft, so that when the rear end of the frame is lowered the spool will be lifted and the shaft placed in its bearing, thus using the machine as a lever of the first order. All the other operations required to wind and stretch wire will also be readily understood, and the advantages gained by the use of the machine comprehended by persons familiar with making wire fences.

I claim as my invention—

1. In a fence-making machine, a frame having traction-wheels at its front end and feet at its rear end, shaft-bearings at the front end of its side pieces, curved backward projections in front of the shaft-bearings, and adjustable devices for fastening a rotating shaft in the said shaft-bearings, to operate in the manner set forth.

2. The shaft-bearings C and projections $C^2$, and the hooks $g$ and springs $f$, and the frame A $A^2$, supported upon wheels and feet, constructed and combined substantially as shown and described, for the purposes stated.

3. The shaft D, having a face-wheel, $D^2$, and a lateral projection, $D^3$, on the hub of said wheel, for the purposes stated.

4. The rock-shaft $g'$, in combination with the hooks $g$ and rods $g''$, for the purposes stated.

5. The combination of the hooks $g$, rock-shaft $g'$, the spring $f$, and lever $f'$, for the purposes specified.

6. The shaft J, having a pinion at one end and a crank at the other, in combination with the frame A $A^2$, and the shaft D, having a fixed face-wheel $D^2$, for the purposes stated.

ALVIN DE WITT.

Witnesses:
J. H. PETTY,
JOHN MURER.